United States Patent Office 3,247,164
Patented Apr. 19, 1966

3,247,164
SOLUBILIZATION OF SALTS OF BISPHENOLS IN MANUFACTURE OF POLYCARBONATES
John R. Caldwell, Kingsport, Tenn., assignor to Eastman Kodak Company, Rochester, N.Y., a corporation of New Jersey
No Drawing. Filed Sept. 14, 1961, Ser. No. 137,966
11 Claims. (Cl. 260—47)

This invention relates to means for dissolving alkali metal salts of bisphenols. More particularly the invention relates to means for dissolving alkali metal salts of bisphenols in solutions to be used in an interfacial polycondensation reaction involving the bisphenol.

An object of the invention is to provide aqueous solutions in which alkali metal salts of certain bisphenols will dissolve readily to make possible an interfacial polycondensation reaction process employing aqueous solutions of these salts. Another object is to provide more concentrated aqueous solutions of low-solubility alkali metal salts of bisphenols for use in interfacial polycondensation reaction processes. Another object is to dissolve normally insoluble or only slightly soluble alkali metal salts of bisphenols by use of one of several special solvents which are relatively soluble in water, are capable of solubilizing the bisphenol salts, and are chemically inert and stable under conditions prevailing in an interfacial polycondensation reaction involving the bisphenol salt.

Bisphenols useful for making polycarbonates have the general structure

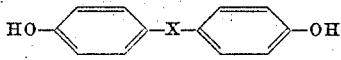

where X may be any of various radicals, such as aliphatic, cycloaliphatic and polycycloaliphatic hydrocarbons. There may be substituents on the phenols or on the X nucleus. In bisphenols in which X contains more than about 5 carbon atoms, the sodium or potassium salts of the bisphenols are relatively insoluble in water and form a suspension in the aqueous hydroxide solution when the bisphenol is added in concentrations necessary for interfacial polycondensation reactions. By use of the special solvents described here, these salts are dissolved and a clear solution is obtained. In general, the process of the application is applicable to all types of bisphenols. It is especially valuable in the case of bisphenols with bulky groups, for instance, the polycyclic bisphenols described in the co-pending application Serial No. 137,980 entitled, Bisphenol Polyesters, filed of even date herewith, now abandoned. The process is also particularly valuable for solubilizing the salts of bisphenols having the above formula in which X is

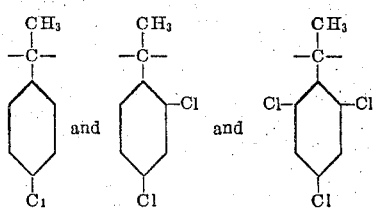

A useful process for producing polycarbonates involves an interfacial polycondensation process between phosgene or diol bischloroformates in an organic solvent phase and an alkali metal salt of a bisphenol in an alkaline aqueous phase. Such reactions are described by Schnell in Angew. Chemie, 68, 633–660 (1956), and by Morgan in Society of Plastics Engineers Journal, 15, 485–95 (1959). In such a process the bisphenol reagent is dissolved in an alkaline aqueous phase. A bisphenol salt is formed by reaction of the bisphenol with the alkali. If the solubility of this salt is low, the solution will soon reach equilibrium concentration and the salt will precipitate from solution as additional bisphenol is added. If the maximum water solubility of the salt in water is less than the concentration needed to maintain the polycondensation reaction, the process cannot be used. In some cases the salts will dissolve in water sufficiently to maintain only a very slow reaction rate. According to the invention a suitably high concentration of a low-solubility bisphenol salt in solution in the aqueous phase is obtained by addition of special solvents to the aqueous phase. The mixture of water and special solvent is adjusted so that the salt is sufficiently soluble therein to produce solutions of the desired concentration.

When the bisphenol salts precipitate from the aqueous phase, a slurry or suspension is formed. Previously the reaction had to be conducted using this slurry or suspension as the aqueous phase. Even in such cases where the reaction proceeds it is evident that a solution can be handled and processed much more conveniently and economically than a slurry or suspension. The advantages of the solution are especially important in a continuous process where the bisphenol must be continuously introduced in accurately measured quantities. The use of a homogeneous solution of the bisphenol salt is also valuable in batch polymerization reactions because the problem of the salt settling out of the suspension and forming lumps and aggregates is eliminated.

The special solvents used in the process of the invention must have the following properties:

(1) They must be relatively soluble in water,
(2) They must be chemically inert and stable under the conditions prevailing in the reaction mixture, and
(3) They must be capable of solubilizing the bisphenol salts.

The following compounds meet these requirements:

A. *Tertiary alcohols.*—As represented by tertiary butyl alcohol and 2,5-dimethylhexane-2,5-diol.

B. *Cyclic ethers.*—As represented by dioxane, tetrahydrofuran, 1,3-dioxolane and 2-methyl-1,3-dioxolane.

C. *Linear polyethers.*—As represented by ethylene glycol dimethyl ether, ethylene glycol diethyl ether, diethylene glycol dimethyl ether, diethylene glycol diethyl ether, triethylene glycol dimethyl ether, and tetraethylene glycol diethyl ether.

The amount of special solvent used will depend upon factors such as the solubility properties of the particular bisphenol and the particular special solvent chosen, the desired concentration of the bisphenol salt in the solution, and the reaction temperature. In general, from 30 to 100 parts of the special solvent for 100 parts of water is sufficient to produce the desired concentrations for interfacial polycondensation reactions, and in most cases from 30 to 50 parts will be sufficient.

The following examples illustrate the invention by reference to specific embodiments:

Example 1

In this experiment the amount of certain special solvents required to produce a homogeneous aqueous solution of the disodium salt of 4,4'-(hexahydro-4,7-methanoindan-5-ylidene)diphenol was determined. A mixture was made of 1.4 g. sodium hydroxide, 25 ml. water and 4.2 g. of the diphenol. A large amount of insoluble material was present. The mixture was stirred at room temperature and the special solvent was added dropwise until a substantially clear solution was obtained. The volume of special solvent required to produce a clear solution is given in the table below.

| Solvent: | Volume to give clear solution, ml. |
| --- | --- |
| Tert-butyl alcohol | 10 |
| Dioxane | 6 |
| Ethylene glycol diethyl ether | 30 |
| Diethylene glycol diethyl ether | 10 |
| Diethylene glycol dimethyl ether | 10 |
| Ethylene glycol dimethyl ether | 8 |
| Triethylene glycol diethyl ether | 10 |

Equivalent amounts of additional water did not materially reduce the amount of undissolved salts in the aqueous phase.

Example 2 illustrates a batch method for preparing a polycarbonate by interfacial polycondensation between a bisphenol salt in an aqueous solution and phosgene in a methylene chloride solution.

Example 2

The following materials were placed in a flask equipped with an agitator, thermometer, and inlet for phosgene:

| | |
| --- | --- |
| Sodium hydroxide, g. | 5.7 |
| Water, cc. | 100.0 |
| 4,4'-(hexahydro-4,7-methanoindan-5-ylidene)-diphenol, g. | 16.9 |
| Methylene chloride, cc. | 100.0 |
| Tert-butyl alcohol, cc. | 40.0 |
| Tributylamine, g. | 0.1 |

The mixture was stirred at 20–25° C. Two liquid layers were obtained and there was no evidence of undissolved bisphenol salt. Phosgene (5.6 g.) was passed in during a period of 20–30 minutes and the mixture was stirred for 40 minutes longer. Three grams of sodium hydroxide in 10 cc. water was added, and stirring was continued for 15 minutes. Acetic acid was then added to stop the reaction and the polymer was isolated in the usual way. The polymer had an inherent viscosity of 0.94.

Example 3 describes the preparation of a polycarbonate by interfacial polycondensation between a bisphenol in aqueous solution and phosgene in methylene chloride solution.

Example 3

The following materials were mixed to give a clear solution:

| | |
| --- | --- |
| Sodium hydroxide, g. | 5.7 |
| Water, cc. | 100.0 |
| 4,4'-(hexahydro-4,7-methanoindan-5-ylidene)-diphenol, g. | 16.9 |
| Dioxane, cc. | 30.0 |
| Tributylamine, g. | 0.1 |

A solution of 5.6 g. phosgene in 100 cc. methylene chloride was prepared. The bisphenol solution and the phosgene solution were fed into the top of a vertical reactor by means of metering pumps. A solution of the polycarbonate in methylene chloride was removed at the bottom of the reactor. A polymer having a viscosity of 1.28 was obtained. When the dioxane was omitted from the aqueous solution, a slurry was obtained that could not be fed through the metering pump.

Example 4 describes a continuous process for preparation of a polycarbonate by interfacial polycondensation between a bisphenol in aqueous solution and a bischloroformate of a diol in methylene chloride solution.

Example 4

The following materials were mixed to give a clear solution:

| | |
| --- | --- |
| Sodium hydroxide, g. | 5.7 |
| Water, cc. | 100.0 |
| 4,4'-(2-norcamphanylidene)-diphenol, g. | 45.0 |
| Diethylene glycol diethyl ether, cc. | 45.0 |
| Benzyltrimethylammonium chloride, g. | 0.1 |

A solution of 12.5 g. of the bischloroformate of 2,5-norcamphanediol in 120 cc. methylene chloride was prepared. The bisphenol solution and the dischloroformate solution were fed into the top of a vertical reactor by means of metering pumps. A solution of the polycarbonate in methylene chloride was removed at the bottom of the reactor.

The examples above are given to illustrate only specific embodiments of the invention and should not be construed to limit the scope of the invention as defined in the following claims.

I claim:

1. A process for synthesis of polycarbonates comprising the step of intimately contacting an alkaline aqueous phase to which a bisphenol has been added and an organic solvent phase to which has been added a diacid chloride selected from the group consisting of phosgene and diol bischloroformates, wherein said aqueous phase consists of a solution prepared by mixing water, a bisphenol having the general formula

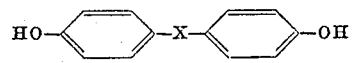

wherein X represents a bivalent organic radical which contains 5 or more carbon atoms, an alkali metal hydroxide, and a special solvent which is inert in the polycarbonate synthesis and selected from the group consisting of tertiary alcohols, cyclic ethers and linear polyethers having a molecular weight of no greater than about 250.

2. In the process for synthesis of polycarbonates comprising intimately contacting an alkaline aqueous phase to which a bisphenol has been added and an organic solvent phase to which has been added a diacid chloride selected from the group consisting of phosgene and diol bischloroformates, the improvement comprising adding to said aqueous phase a volume of special solvent sufficient to solubilize all of the salt produced by reaction of the bisphenol with the alkali in said aqueous phase, the said special solvent being inert in the polycarbonate synthesis and selected from the group consisting of tertiary alcohols, cyclic ethers, and linear polyethers having a molecular weight of no greater than about 250.

3. The process of claim 1 wherein said special solvent is selected from the group consisting of tertiary butyl alcohol, dioxane, ethylene glycol diethyl ether, diethylene glycol diethyl ether, diethylene glycol dimethyl ether, ethylene glycol dimethyl ether, and triethylene glycol diethyl ether.

4. The process of claim 3 wherein said diacid chloride is phosgene and said bisphenol is 4,4'-(hexahydro-4,7-methanoindan-5-ylidene)diphenol.

5. The process of claim 4 wherein said special solvent is tertiary butyl alcohol.

6. The process of claim 4 wherein said special solvent is dioxane.

7. The process of claim 4 wherein said special solvent is ethylene glycol dimethyl ether.

8. The process of claim 3 wherein said diacid chloride is the bischloroformate of 2,5-norcamphanediol and said bispenol is 4,4'-(2-norcamphanylidene)diphenol.

9. The process of claim 8 wherein said special solvent is diethylene glycol diethyl ether.

10. The process of claim 2 wherein said diacid chloride is the bischloroformate of 2,5-norcamphanediol and said bisphenol is 4,4'-(2-norcamphanylidene)diphenol.

11. The process of claim 10 wherein said special solvent is diethylene glycol diethyl ether.

References Cited by the Examiner

UNITED STATES PATENTS

| | | | |
|---|---|---|---|
| 2,829,175 | 4/1958 | Bowman | 260—619 |
| 3,043,800 | 7/1962 | Schnell | 260—47 X |
| 3,053,904 | 9/1962 | Rocklin | 260—619 |
| 3,143,525 | 8/1964 | Ott | 260—47 X |
| 3,161,615 | 12/1964 | Goldberg | 260—47 X |

OTHER REFERENCES

Durrans, Solvents, Van Nostrand, New York (1947), pp. 104, 153 and 158-9.

SAMUEL H. BLECH, *Primary Examiner.*

HAROLD N. BURSTEIN, MURRAY TILLMAN, *Examiners.*